F. H. ROYCE.
CHANGE SPEED GEARING FOR POWER PROPELLED VEHICLES.
APPLICATION FILED JUNE 6, 1914.
1,149,408.
Patented Aug. 10, 1915.
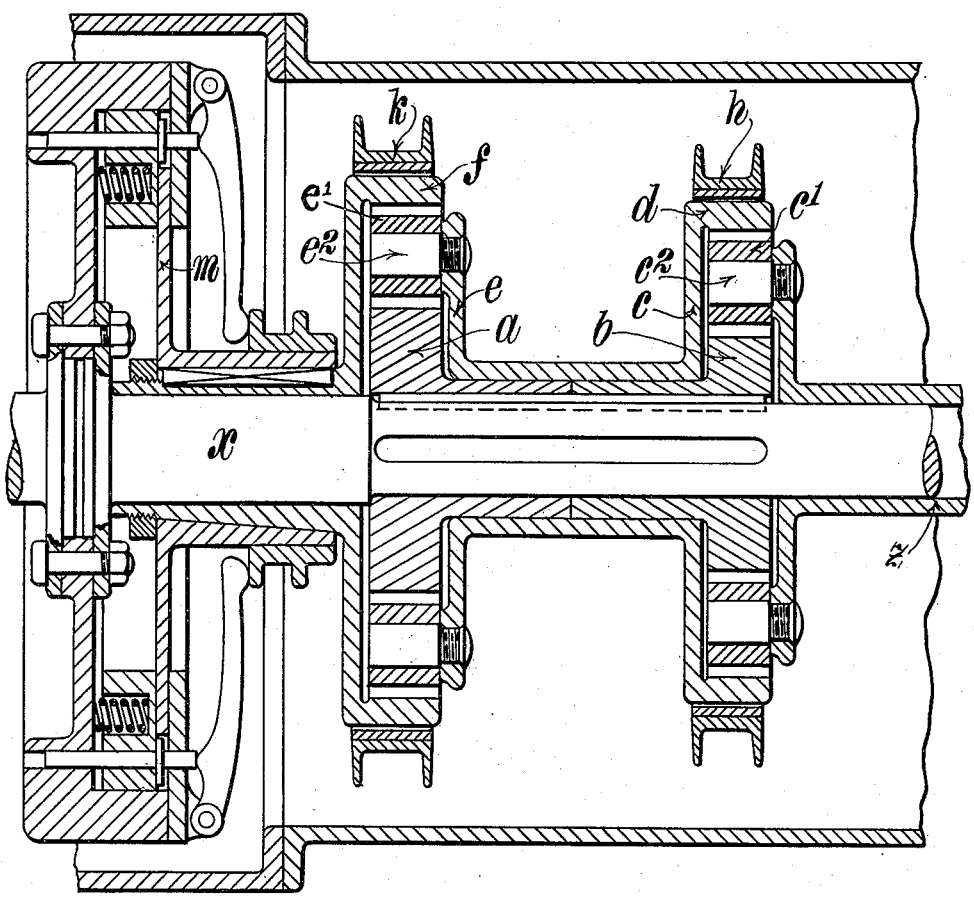
WITNESSES
H. E. Bready.
INVENTOR
F. H. Royce.
per Percy H. Moore
Attorney.

UNITED STATES PATENT OFFICE.

FREDERICK HENRY ROYCE, OF DERBY, ENGLAND.

CHANGE-SPEED GEARING FOR POWER-PROPELLED VEHICLES.

1,149,408.  Specification of Letters Patent.  Patented Aug. 10, 1915.

Application filed June 6, 1914. Serial No. 843,552.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in Change-Speed Gearing for Power-Propelled Vehicles, of which the following is a specification.

This invention relates to improvements in gearing of the epicyclic type for obtaining various speeds between the driving and driven elements of power propelled vehicles, and it has for its object generally to overcome some of the difficulties which are experienced in providing an efficient gearing of this type and specifically to provide a second speed ratio of higher efficiency than has hitherto been possible with compounded gears.

I attain the object of the present invention by the construction shown in the accompanying drawing in which the essential feature is the driving of the accelerating train from the driving element and not as previously from the driven element of the gearing.

The gearing consists essentially of two epicyclic trains hereinafter referred to as the main train and the accelerating or secondary train. The sun wheels $a$ and $b$ of the accelerating and main trains respectively are both fixed on the driving element $x$, said element in the construction shown being formed in two parts for convenience, both parts being rigidly fixed together and one of them being the crank shaft of the prime mover. The sun wheel $b$ of the main train—which gives the first or lowest speed—engages with planet pinions $c^1$ revolubly mounted on pins $c^2$ carried by a planet disk $c$, said planet disk being mounted on or forming part of the driven element $z$. The internally toothed annulus $d$ of the main train, with which the pinions $c^1$ mesh, is formed in one with or is rigidly connected to the planet disk $e$ of the accelerating train and is capable of being held stationary by the brake band $h$. The planet disk $e$ of the accelerating train carries pins $e^2$ on which are revolubly mounted the planet pinions $e^1$ which mesh with the sun wheel $a$. The internally toothed annulus $f$ of the accelerating train, which is loosely mounted on the driving element $x$, is capable either of being held stationary by the brake band $k$ or of being connected to the driving element $x$ by the friction clutch $m$, said clutch being held out of engagement for all speeds except the top or direct drive.

The first or lowest speed is obtained by tightening the brake band $h$ on the annulus $d$ whereby the planet disk $c$ and the driven element $z$ are caused to rotate at a predetermined relatively lower speed than the driving element $x$, the speed of $z$ being in the gearing illustrated approximately .36 of the engine speed.

The second speed is obtained by tightening the brake band $k$ on the annulus $f$, the brake band $h$ being free. The annulus $d$ will now receive motion from this accelerating train through the planet disk $e$ and thus the planet disk $c$ and the driven element $z$ will have a relatively higher speed than they had on the first gear when the annulus $d$ was held stationary, the speed of $z$ in this case being approximately .6 of the engine speed.

The third speed or direct drive is obtained by engaging the clutch $m$, which latter couples the annulus $f$ to the driving element $x$, the brake bands $h$ and $k$ being free. The sun wheel $a$ thus becomes coupled to the annulus $f$, which thereby affects a couple between the annulus $d$ and the sun wheel $b$, whereby a couple is affected between the driving and driven elements and the main and accelerating trains are caused to rotate en bloc.

With this method of obtaining the direct drive the driving torque on the clutch is considerably less than the engine torque, and said driving torque is reduced to a greater extent than has hitherto been possible with other arrangements of epicyclic gearing, which enables a friction clutch of light construction, easy manipulation, quick and effective disengagement to be employed. This reduction in torque on the clutch may be explained as follows:—First, there is a reduced torque on the annulus of the main train, the torque being inversely proportional to the relative speeds of the annulus and planet disk when the sun wheel is held stationary. Secondly, this torque is further reduced by the accelerating train before the clutch is reached, and thus the total reduction in torque on the clutch is considerable and amounts to approximately half the engine torque.

What I claim as my invention and desire to secure by Letters Patent is:—

1. In change speed gearing of the epicyclic type, the combination of a train comprising a sun wheel fixed on the driving element, a disk in driving connection with the driven element, planet pinions carried by said disk and gearing with said sun wheel, and an internally toothed annulus freely mounted in relation to the driving element and gearing with the planet pinions; of a second or accelerating train comprising a sun wheel fixed on the driving element, a disk in driving connection with the annulus of the first train, planet pinions carried by said disk and gearing with said sun wheel, and an internally toothed annulus freely mounted in relation to the driving element and gearing with said planet pinions; of means for holding the annuli of the two trains stationary; and of means for coupling the annulus of the second or accelerating train to the driving element.

2. In a system of epicyclic gearing the combination with a main train comprising a sun wheel fixed to the driving element, planet pinions carried by the driven element, and a freely mounted internally toothed annulus gearing with said planet pinions; of an accelerating train comprising planet pinions carried by a disk in driving connection with the annulus of the main train, a sun wheel in driving connection with the sun wheel of the main train, and a freely mounted internally toothed annulus gearing with said planet pinions; and of means for holding the annulus of the accelerating train stationary whereby the planet disk of the auxiliary train and with it the annulus of the train is caused to rotate thereby giving a speed ratio between the driving and driven elements of higher value than the ratio which is rendered operative by holding the annulus of the main train stationary.

3. In a change speed gearing of the epicyclic type, the combination of a main gear train comprising a sun wheel fixed on the driving element, a disk in connection with the driven element, planet pinions carried by said disk and gearing with said sun wheel, and an internally toothed annulus freely mounted in relation to the driving element and gearing with the planet pinions; of an accelerating train comprising a sun wheel fixed on the driving element, a disk in driving connection with the annulus of the first train, planet pinions carried by said disk and gearing with the sun wheel, and an internally toothed annulus freely mounted in relation to the driving element and gearing with said planet pinions; of means for coupling the annulus of the accelerating train to the sun wheel of said train; of means for coupling the disk carrying the planet pinions of the main train to the driving element; and of means for holding the annulus of each of the trains stationary.

In testimony whereof I have signed my name in the presence of two subscribing witnesses.

FREDERICK HENRY ROYCE.

Witnesses:
CONSTANCE POPPLETON,
MAURICE OLLEY.